United States Patent [19]

Steinhart et al.

[11] Patent Number: 4,606,489
[45] Date of Patent: Aug. 19, 1986

[54] PROCESS AND APPARATUS FOR CONTROLLEDLY DECELERATING A MOBILE TOOL OR WORKPIECE

[75] Inventors: Wilhelm Steinhart, Friedberg; Rüdolf Mitschele, Augsburg, both of Fed. Rep. of Germany

[73] Assignee: Kuka Schweissanlagen & Roboter GmbH, Augsburg, Fed. Rep. of Germany

[21] Appl. No.: 514,151

[22] Filed: Jul. 14, 1983

[30] Foreign Application Priority Data

Jul. 14, 1982 [DE] Fed. Rep. of Germany ....... 3226362

[51] Int. Cl.⁴ ............................................. B23K 20/12
[52] U.S. Cl. .................................... 228/102; 228/112; 228/2; 228/9; 318/618; 318/632
[58] Field of Search ........................ 228/112, 114, 2, 7, 228/9, 103; 318/561, 612, 615, 616, 617, 618, 632

[56] References Cited

U.S. PATENT DOCUMENTS

| | | | |
|---|---|---|---|
| 3,542,274 | 11/1970 | Miller | 228/2 |
| 3,750,927 | 8/1973 | Miller et al. | 228/2 |
| 3,876,873 | 4/1975 | Slawson | 318/561 X |
| 3,888,405 | 6/1975 | Jones et al. | 228/2 |
| 3,972,465 | 8/1976 | Takaoka et al. | 228/2 X |
| 4,263,537 | 4/1981 | Bettin et al. | 318/616 X |
| 4,473,786 | 9/1984 | Miyashita et al. | 318/617 X |

FOREIGN PATENT DOCUMENTS

| | | |
|---|---|---|
| 2228735 | 1/1973 | Fed. Rep. of Germany . |
| 2228736 | 6/1973 | Fed. Rep. of Germany . |
| 1588782 | 8/1973 | Fed. Rep. of Germany . |
| 2436128 | 2/1975 | Fed. Rep. of Germany . |

Primary Examiner—Kenneth J. Ramsey
Attorney, Agent, or Firm—Karl F. Ross; Herbert Dubno

[57] ABSTRACT

For the controlled slowdown of a translatory or rotary machine part to arrest same in a predetermined stop position of an entrained load, the part being driven by an electric motor against a countervailing torque, a trial run is used with a constant motor torque (less than the countervailing torque) to determine a deceleration characteristic under conditions duplicating those of a subsequent production run. The deceleration characteristic is registered in the form of discrete positional values detected at successive instants, these values being stored in a memory for consecutive readout at corresponding instants in a production run and comparison with actual load positions to provide an error signal for the adjustment of the motor torque. A specific embodiment serves to control the final position of a rotary workpiece holder in friction welding.

6 Claims, 9 Drawing Figures

PROCESS AND APPARATUS FOR CONTROLLEDLY DECELERATING A MOBILE TOOL OR WORKPIECE,

FIELD OF THE INVENTION

Our present invention relates to a process for decelerating a motor-driven machine part in a controlled manner to let it come to rest in a predetermined position of a load, such as a tool or a workpiece, entrained thereby. The movement of the machine part may be either linear or rotary and, in either case, is resisted by a countervailing force that must be overcome by a forward torque of the driving motor in an initial phase to accelerate the machine part to a certain speed from which the controlled deceleration is to take place.

BACKGROUND OF THE INVENTION

Significant countervailing forces of a resistive nature exist, for example, in the operation of a milling machine with a tool-carrying slide designed to cut a groove of predetermined length into a workpiece. Another instance, involving rotary instead of translatory motion, is a friction-welding machine in which two workpieces axially pressed together are relatively rotated to generate heat enabling their fusion under momentarily intensified axial pressure upon their arrival in a predetermined relative angular position. Such a friction-welding machine has been described, for example, in commonly owned pending application Ser. No. 339,102 filed Jan. 13, 1982 by Manfred Menzinger, now abandoned.

A complete cutoff of the energization of the drive motor upon the arrival of the load in the selected end position is generally undesirable since, aside from the shock exerted upon the load and the driven machine part, the combined inertia of that part and its load will tend to let it overshoot that position to an extent not readily ascertainable in advance. A better approach, therefore, is to reduce the driving torque to a value which lets the machine part coast to a stop more slowly and at a rate which can be empirically optimized. A friction-welding machine in which this principle is realized by purely mechanical means is disclosed in German laid-open application No. 24 36 128 according to which a shaft of a workpiece holder is initially coupled with a high-speed drive and is switched to a low-speed drive before being braked to standstill in a final position.

Such relatively cumbersome equipment is not very suitable for use in a system wherein, e.g. for friction-welding purposes, a rotary machine part is to be decelerated within a minor fraction of a second for letting the load come to rest in a stop position deviating by not more than a fraction of a degree from the desired end position.

In other systems, in which inertia rather than a countervailing resistive force is the predominant decelerating parameter, it is known to control the speed reduction of a machine part by electronic means on the basis of an operating characteristic established during an acceleration phase. With the exertion of a constant driving torque, a rotating machine part accelerates along a generally straight line or ramp characteristic to a maximum speed from which it will decelerate at substantially the same linear rate when the motor is de-energized. With the deceleration time thus known from the acceleration phase, voltage is cut off in a position suitably selected to let the load arrive with a near zero speed at the desired point where it can easily be braked to complete standstill. Such a technique, however, does not work in a situation as here contemplated in which a resistive force opposing the rotation of the driven part retards its acceleration and intensifies its deceleration so as to make the durations of the two phases significantly different from each other. A position sensor coacting with the driven part, or possibly with the load itself, would then have to take over in the terminal portion of the deceleration phase to continue the slow rotation up to the desired end position; the time required for reaching that position, starting with the instant of motor cutoff, would then be considerably lengthened. Tests have shown that, in a friction-welding machine equipped with such a control system, an acceleration phase of 300 ms is followed by a deceleration phase of 600 to 700 ms under the most favorable circumstances. This delay is inconvenient not only on account of the extended operating period but also because the frictionally generated heat of the workpieces tends to dissipate during the slow final positioning, thus before the actual welding stroke can be executed.

OBJECTS OF THE INVENTION

The general object of our present invention, therefore, is to provide a process and an apparatus for the quick and accurate deceleration and arrestation of a load-entraining machine part whose movement is significantly opposed by a countervailing resistive force as discussed above.

A more particular object is to provide an improved process and apparatus for friction welding which obviates the drawbacks referred to.

SUMMARY OF THE INVENTION

In accordance with our present invention, a motor driving a linearly or rotatingly movable machine part to be slowed to standstill is energized in a trial run, substantially duplicating a subsequent production run, with a forward torque overcoming the countervailing resistive force to accelerate the machine part to an initial speed which may be held substantially constant for a certain time. At a starting instant, upon an approach of a desired end position by the entrained load, this forward torque is reduced to a steady value insufficient to overcome the countervailing force with resulting slowdown to eventual standstill. Throughout that slowdown, a multiplicity of points of a deceleration characteristic are plotted by ascertaining and registering incremental advances of the driven machine part during a succession of predetermined time intervals that include a final interval in which the load comes to rest in a stop position. In a subsequent production run, taking place under essentially the same conditions as the trial run, the motor is re-energized to accelerate the driven machine part to the aforementioned initial speed. From the overall advance which has occurred in the slowdown phase of the preceding trial run, i.e. from the sum of the incremental advances referred to, we determine a starting position from which a progressive speed reduction in conformity with the plotted deceleration characteristic establishes a stop position coinciding with the desired end position. When the driven part passes through this starting position, the forward torque of the motor is reduced to an adjustable value substantially corresponding to the steady value used in the slowdown phase of the trial run. In a succession of time intervals corresponding to those of the trial run, incremental advances of the machine part are measured and the resulting actual advance of the part is compared at the end of each time interval with a prescribed advance according to the established deceleration characteristic as determined from the previously registered incremental advances pertaining to the preceding time intervals. This comparison yields an error signal which is used to modify the adjustable value of the forward torque so as to maintain the slowdown of the machine part in the production run substantially in conformity with the available deceleration characteristic.

In the specific embodiment described hereinafter, in which the machine part is a rotatable holder for a first workpiece to be joined by friction welding to a second workpiece in a predetermined relative angular position of these two workpieces, the countervailing force is a frictional torque due to surface contact existing between the workpieces on approaching that relative position, as will be apparent from the foregoing discussion.

An apparatus according to our invention, designed to implement the present method, comprises adjustable speed-control means for energizing the drive motor with a variable torque, position-sensing means operatively coupled with the driven machine part for measuring incremental advances of the load, clock means for establishing a succession of predetermined time intervals during trial and production runs, memory means loadable with the magnitudes of these incremental advances during a deceleration period of a trial run, comparison means connected to the memory means and to the position-sensing means during a production run for generating error signals in response to deviations of an actual advance of the machine part from a prescribed advance as determined on the basis of incremental advances read out from the memory means at the end of successive time intervals in a deceleration period of a production run, and logic means connected to the comparison means for modifying the operation of the speed-control means in response to the generated error signals so as to arrest the load entrained by the machine part in a stop position corresponding to the desired end position.

Depending on the type of process to be controlled, the trial run may be carried out with the same load (e.g. a milling tool) as in the subsequent production run, with a substantially identical load (as in friction welding), or with a dummy load having the same essential characteristics as the load or loads used in actual production.

BRIEF DESCRIPTION OF THE DRAWING

The above and other features of our invention will now be described in detail with reference to the accompanying drawing in which.

SPECIFIC DESCRIPTION

Figure 1:
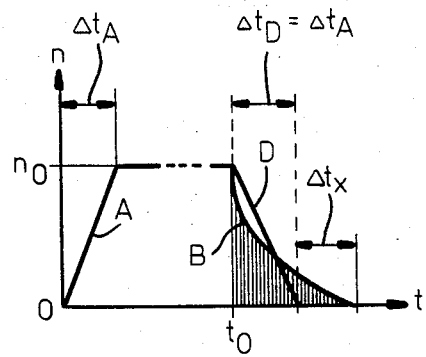
FIG. 1 is a graph showing acceleration and deceleration curves in a friction-welding machine which is electronically controlled in accordance with the known procedure referred to above.

In FIG. 1 we have diagrammatically illustrated the mode of operation of a conventional electronic speed-control system as applied to a rotary machine part whose motion is opposed by a strong countervailing torque, e.g. on account of surface contact between two workpieces to be friction-welded to each other. In this graph, in which rotary speed n has been plotted against time t, an acceleration phase $\Delta t_A$ is marked by a rising ramp A representing a linear increase in speed from zero to a maximum value $n_0$. A symmetrical ramp D, marking a theoretical deceleration phase $\Delta t_D$ of the same duration as phase $\Delta t_A$, starts at a suitably selected instant $t_0$ and is used as a reference in letting the driven part come to a stop in a selected end position. The countervailing torque, however, exerts a braking action resulting in an actual deceleration curve B which would arrest the driven part well before the end of phase $\Delta t_D$ and therefore in an unpredictable position which in all likelihood would be offset from the desired end position. Thanks to the intervention of a position sensor, curve B is modified to intersect the ramp D and to let the speed n go to zero in the proper angular position of the load, i.e. at a time when the area underneath curve B equals the shaded area underneath ramp D. This occurs, as shown, after a delay $\Delta t_x$ which is of the same order of magnitude as the duration of phases $\Delta t_A$ and $\Delta t_D$. Such a delay, as already noted, is particularly undesirable in friction welding since it tends to lower the temperature of the contacting workpieces.

Figure 2:
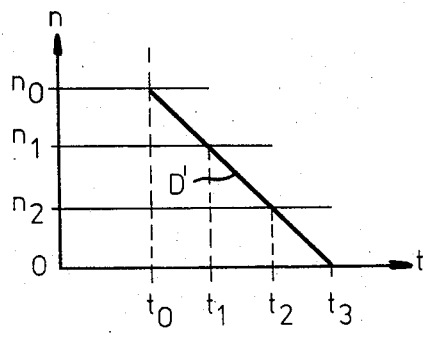
FIG. 2 is a graph showing the establishment of a deceleration characteristic in accordance with our present invention.

We shall now refer to FIG. 2 depicting a deceleration phase in a system according to our invention. More particularly, the graph of FIG. 2 shows the establishment of a ramp D' during a trial period in which a forward torque less than the countervailing frictional torque is exerted by the electric motor upon the driven machine part whereby the latter comes to a halt at a time $t_3$. In between, at several instants of which only two have been indicated at $t_1$, $t_2$ but which in practice may be considerably more numerous, the angular position of a load entrained by the rotary machine part is measured and stored in a memory as described hereinafter with reference to FIG. 8. These measurements are made after intervals of uniform duration in which the rotary speed of the driven part is progressively reduced to $n_1$, $n_2$ and, finally, zero.

Figure 3:
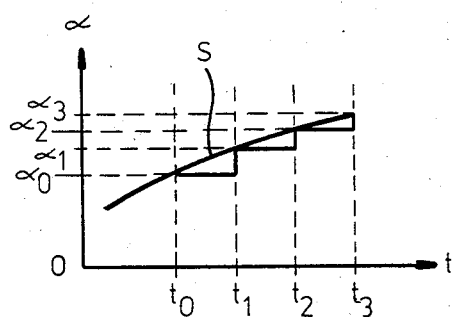
FIG. 3 is a graph showing the incremental advances of a rotary machine part during a trial run of a friction-welding assembly.
Figure 4:
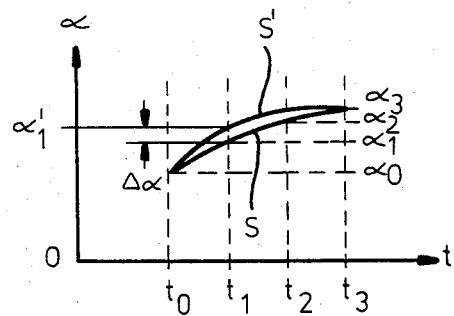
FIG. 4 is a graph similar to that of FIG. 3, illustrating deviations of actual incremental advances from those conforming to the established deceleration characteristic.

FIG. 3 shows the angular positions $\alpha_0$, $\alpha_1$, $\alpha_2$ and $\alpha_3$ respectively occupied by the load at times $t_0$, $t_1$, $t_2$ and $t_3$. Measured at times $t_1$, $t_2$ and $t_3$ are the incremental advances $\alpha_1-\alpha_0$, $\alpha_2-\alpha_1$ and $\alpha_3-\alpha_2$. The sum of all these incremental advances represents the braking distance and gives the starting position in which deceleration during a production run should begin (at instant $t_0$) in order to let the load come to a stop (at instant $t_3$) in the desired end position. The several measuring points lie on a curve S and constitute the set-point values in a production run in which, as shown in FIG. 4, the actual values (i.e. the angular positions measured at instants $t_0$–$t_3$) lie on a curve S' deviating from curve S. In order to let the two curves converge in the final position at instant $t_3$, their deviations are determined at the intervening instants to provide error signals for a compensatory adjustment of the motor torque as more fully described hereinafter. One such deviation $\Delta\alpha$, illustrated in FIG. 4, occurs between the prescribed angular position $\alpha_1$ and the actual angular position $\alpha_1'$ at instant $t_1$.

Figure 5:
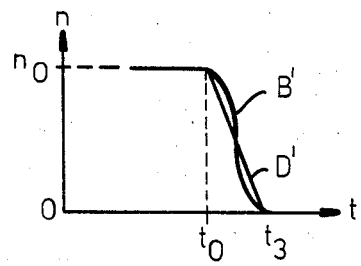
FIG. 5 is a further graph illustrating speed changes in a deceleration phase of a production run of the assembly to which FIGS. 2-4 apply.

FIG. 5 is a graph similar to that of FIG. 1 wherein, however, the ramp D' of FIG. 2 serves as the deceleration characteristic to which an actual braking curve B' should conform as closely as possible in order to let the load come to a halt at instant $t_3$. As discussed in connection with FIG. 1, the areas underneath ramp D' and curve B' must be equal if the load is to stop in the desired end position. In the example shown in FIG. 4, according to which the deviation $\Delta\alpha$ is positive with the load overshooting its set-point position at the end of the first measuring interval, the motor torque will have to be reduced below the value used in the trial run in order to provide a generally S-shaped curve B' intersecting the ramp D' and rejoining it at instant $t_3$. In practice, of course, there may be several such intersections when the deceleration phase is subdivided into a larger number of measuring intervals.

Figure 6A:
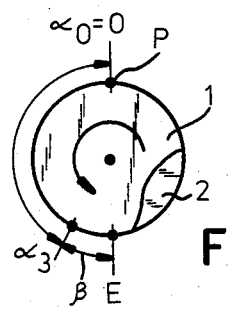
FIGS. 6A and 6B show relative angular positions of two workpieces to be friction-welded by a process according to our invention.
Figure 6B:
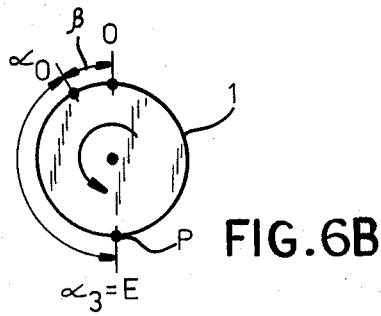

In FIGS. 6A and 6B we have shown, somewhat diagrammatically, two workpieces 1 and 2 of circular outline—e.g. a pair of stub shafts—which are being relatively rotated about a common axis in order to be friction-welded to each other. Workpiece 1 is entrained by a driven machine part, schematically represented as a load shaft 20 in FIG. 7, while workpiece 2 is clamped in a fixed position. A reference point P on the periphery of workpiece 1, such as a mark to be detected visually or by a sensor, is shown in FIG. 6A in a position 0 spaced by half a turn from a desired end position E. When the trial run starting at time $t_0$ in position $\alpha_0=0$ is completed, as described with reference to FIG. 2, point P finds itself in position $\alpha_3$ separated by an angle $\beta$ from end position E. In this specific instance, the angular travel path $\alpha_3$–$\alpha_0$ covered in the deceleration phase extends over less than 180°.

FIG. 6B shows that, in a subsequent production run, the starting position $\alpha_0$ at the inception of the deceleration phase is offset from the zero position by the angle $\beta$ so that, under the conditions discussed with reference to FIG. 5, point P will arrive precisely at the desired end position $\alpha_3=E$ when the workpiece 1 comes to a standstill at instant $t_3$. At that instant, then, actual welding will take place by an intensification of the surface contact between the two workpieces, e.g. as described in the commonly owned Menzinger application identified above. A brakeshoe may be simultaneously applied to the rotatable workpiece 1, as likewise described in that pending application, to insure the precise alignment of the two workpieces with each other; the brakeshoe could be actuated, for example, by a sensor detecting the arrival of point P in position E and cutting off the drive motor at the same time.

The trial run of FIG. 6A could be carried out with the same workpieces as in the production run of FIG. 6B, provided of course that the welding step is omitted at the end of this trial run so that the two workpieces can be readily separated.

Figure 7:
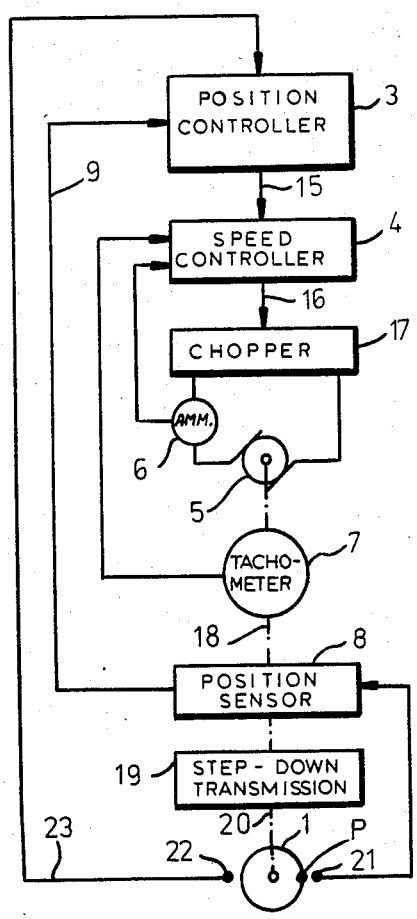
FIG. 7 is a block diagram of a system for controlling the deceleration of a rotary workpiece holder in a friction-welding machine embodying our invention.
Figure 8:
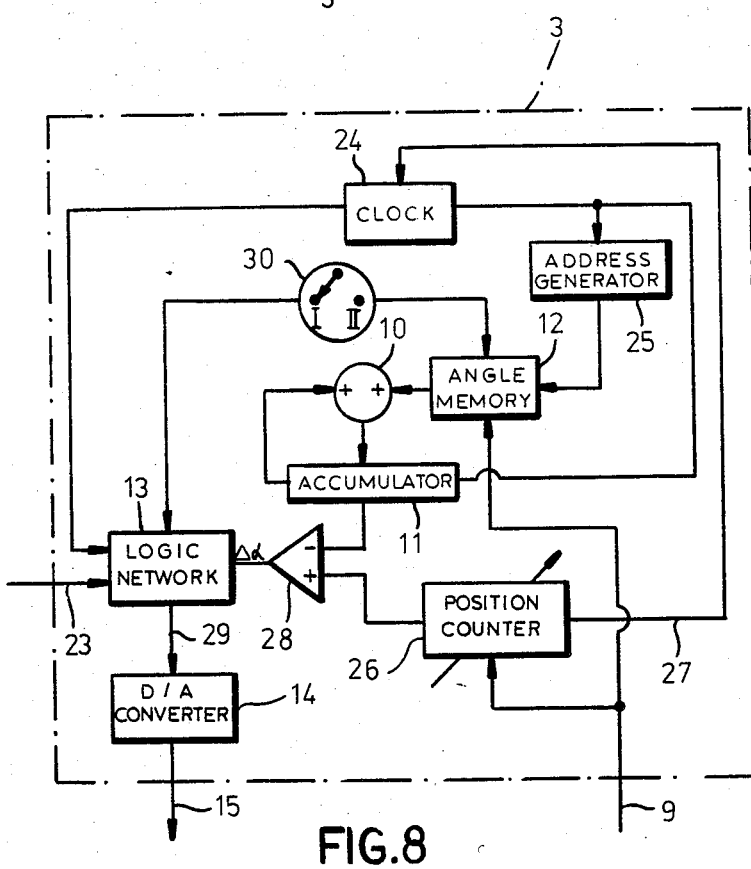
FIG. 8 shows details of a position controller forming part of the circuitry of FIG. 7.

FIG. 7 shows an apparatus for implementing the method described with reference to the preceding Figures. A position controller 3, whose details are shown in FIG. 8, has an output connection 15 extending to a speed controller 4 which determines the energization of a drive motor 5. The motor is here assumed to be of the direct-current type with an operating circuit including a conventional chopper 17 which generates a pulsating current of variable pulse width, e.g. as determined by thyristor-controlled gating means responsive to phasing instructions arriving on a line 16 from circuit 4. An ammeter 6 in series with motor 5 and a tachometer 7 on a shaft 18 driven by that motor feed back current and speed signals to controller 4 which uses them, in a manner well known per se, to vary the driving torque of the motor pursuant to the commands from position controller 3. A position sensor 8 coacting with shaft 18 emits at least one counting pulse per shaft revolution via a lead 9 to controller 3; shaft 18 is coupled through a step-down transmission 19 to the load shaft 20 already referred to which here constitutes a driven machine part entraining the workpiece 1. FIG. 7 also shows two further position sensors 21 and 22, the former serving to activate the sensor 8 in the starting position 0 while the latter reports the arrival of the load in its end position E (FIGS. 6A, 6B) to controller 3 by way of a lead 23.

As shown in FIG. 8, controller 3 comprises an angle memory 12 and a logic network 13 which are settable for a trial run or a production run in a respective position I or II of a manual selector switch 30. A clock 24, when activated by a signal on an output lead 27 of a position counter 26, times the operation of logic network 13 and steps an address generator 25 sequentially enabling respective cells of memory 12 for writing or reading, depending on whether switch 30 is in position I or II. The pulses emitted by sensor 8 (FIG. 7) on lead 9 step the counter 26 and, in switch position I, load the cell of memory 12 currently addressed by generator 25 with a numerical value representing an incremental advance of shaft 20 during a trial run. With a suitable step-down ratio for transmission 19, even a single counting pulse emitted by sensor 8 during each revolution of shaft 18 will recur a number of times in the course of a measuring interval established by clock 24 during which the load 1 turns through a small fraction of a circle.

With switch 30 in position II during a production run, the memory cells so loaded in the preceding trial run are nondestructively read out into an adder 10 which works into an accumulator 11 feeding back its own digital value to another input of the adder. At the beginning of each new clock cycle or measuring interval, therefore, accumulator 11 stores the sum of the incremental advances theretofore extracted from memory 12 even as counter 26 registers the angular distance actually traversed up to then from the beginning of the deceleration phase. In the trial run, that beginning is marked by sensor 21 activating sensor 8 as the point P passes through starting position 0 (FIG. 6A). In a production run, counter 26 can be negatively preset—under the conditions assumed in the description of FIGS. 6A and 6B—so as to reach a count of zero only after the load has passed through the offset angle $\beta$; the activation of clock 24 via lead 27 will be correspondingly delayed so that memory 12 will not be addressed until the load has reached the starting angle $\alpha_0$. Alternatively, of course, sensor 21 (FIG. 7) may be correspondingly displaced at the start of a production run.

The numerical values stored in accumulator 11 and position counter 26 are fed to respective inputs of a comparator 28 which emits the difference Δα as an error signal to logic network 13. Depending on the magnitude and the sign of the error, network 13 generates on an output 29 a command for either increasing or decreasing the forward torque of motor 5 to an extent tending to bring the curve B' of FIG. 5 into line with the deceleration characteristic D', as discussed above. The command emitted by network 13 passes through a digital/analog converter 14 before appearing in the output 15 of controller 3.

An output signal of sensor 22 (FIG. 7) on lead 23, indicating the arrival of the load in its desired end position, causes logic network 13 to command the immediate de-energization of motor 5, the initiation of the welding stroke by a nonillustrated pressure generator and, possibly, the actuation of a brakeshoe as discussed above and disclosed in the commonly owned Menzinger application.

The system according to our invention is highly adaptive and will closely follow the deceleration characteristic established in the trial run even if the countervailing force varies considerably in the course of a deceleration phase. We have found that, in a friction-welding machine as described, a retardation from full speed to zero can be achieved within 300 ms with a positioning tolerance of less than 0.5°.

Although our invention has been specifically described with reference to a rotary load, it will be apparent that the same basic mode of operation can be used with linearly moving machine parts.

We claim:

1. A process for progressively reducing to standstill the speed of a motor-driven machine part to arrest a load entrained thereby in a predetermined end position, said machine part being subjected to a countervailing force significantly resisting its advance, comprising the steps of:
    (a) energizing a motor driving said machine part, in a trial run substantially duplicating a subsequent production run, with a forward torque overcoming the countervailing force and accelerating said machine part to an initial speed;
    (b) at a starting instant, upon an approach of said end position by the entrained load, reducing said forward torque to a steady value insufficient to overcome said countervailing force so as to slow the machine part down to eventual standstill;
    (c) plotting throughout the slowdown of step (b), a multiplicity of points of a deceleration characteristic representing a braking displacement setpoint curve with time by ascertaining and registering incremental advances of said machine part during a succession of predetermined time intervals including a final interval in which the load comes to rest in a stop position;
    (d) in a subsequent production run, energizing said motor to accelerate said machine part to the initial speed of step (a);
    (e) determining from the sum of said incremental advances a starting position from which a progressive speed reduction with time in conformity with said deceleration characteristic establishes a stop position coinciding with said end position;
    (f) reducing the forward torque of said motor, on passage through said starting position, to an adjustable value substantially corresponding to the steady value of step (b);
    (g) measuring incremental advances of said machine part in a succession of time intervals corresponding to those of step (c) and comparing at the end of each time interval a resulting actual advance with a prescribed advance according to said deceleration characteristic as determined from the incremental advances registered in step (c) for the preceding time intervals; and
    (h) modifying said adjustable value, in response to an error signal obtained from the comparison in step (g), to maintain the slowdown of the machine part in said production run substantially in conformity with said deceleration characteristic.

2. A process as defined in claim 1 wherein said part is a rotatable holder for a first workpiece to be joined by friction welding to a second workpiece in a predetermined relative angular position of the two workpieces, the countervailing force being a frictional torque due to surface contact existing between said workpiece on approaching said relative angular position.

3. A process as defined in claim 1 wherein said time intervals are of uniform duration.

4. An apparatus for progressively reducing to standstill the speed of a moving machine part to arrest a load entrained thereby in a predetermined end position, said machine part being subjected to a countervailing force significantly resisting its advance, comprising:
    an electric motor drivingly connected with said machine part for advancing same;
    adjustable speed-control means for energizing said motor with a variable torque;
    position-sensing means operatively coupled with said machine part for measuring incremental advances of said load;
    clock means for establishing a succession of predetermined time intervals;
    memory means loadable, in the form of a braking displacement setpoint value curve with time, with the magnitudes of said incremental advances measured in successive time intervals by said position-sensing means during a deceleration period of a trial run in which said motor is energized by said speed-control means with a forward torque insufficient to overcome said countervailing force whereby said machine part is slowed to standstill in a stop position;
    comparison means connected to said memory means and to said position-sensing means during a production run, substantially duplicating the conditions of said trial run, for generating error signals in response to deviations of an actual advance of said machine part from a prescribed advance based upon measured incremental advances read out at the end of successive time intervals from said memory means during a deceleration period of said production run; and
    logic means connected to said comparison means for modifying the operation of said speed-control means during said production run, in response to said error signals, to arrest the load entrained by said machine part in a stop position corresponding to said predetermined end position.

5. An apparatus as defined in claim 4 wherein said machine part is a rotary holder for a first workpiece to be joined by friction welding to a second workpiece in a predetermined relative angular position of the two workpieces.

6. An apparatus as defined in claim 5 wherein said motor has a shaft coupled to said holder through a step-down transmission, said position sensor coacting with said shaft.

* * * * *